J. T. LAUGHLIN.

EYEGLASS MOUNTING.

APPLICATION FILED APR. 15, 1911.

Reissued Apr. 2, 1912. 13,394.

Inventor
James T. Laughlin.

Witnesses
Chas. W. Eddy.
E. J. Ogden

By Howard E. Barlow
Attorney

COLUMBIA PLANOGRAPH CO., WASHINGTON, D. C.

UNITED STATES PATENT OFFICE.

JAMES T. LAUGHLIN, OF BOISE, IDAHO.

EYEGLASS-MOUNTING.

13,394. Specification of Reissued Letters Patent. Reissued Apr. 2, 1912.

Original No. 957,071, dated May 3, 1910, Serial No. 488,320. Application for reissue filed April 15, 1911. Serial No. 621,430.

*To all whom it may concern:*

Be it known that I, JAMES T. LAUGHLIN, a citizen of the United States, residing at the city of Boise, in the State of Idaho, have invented certain new and useful Improvements in Eyeglass-Mountings, of which the following is a specification, reference being had therein to the accompanying drawing.

This invention relates to eye-glasses of the type wherein the bow-spring and guards are made of one continuous piece of material, preferably spring wire, thereby eliminating the use of screws, and the object in view is the provision of simple and efficient means for affording a relatively large range of adjustment of angles and distances of the lenses with respect to the wearer's eyes.

With this and other detail objects in view, as will be hereinafter set forth, the invention comprises novel constructions, combinations, and arrangements of parts as hereinafter disclosed and claimed.

Figure 1:
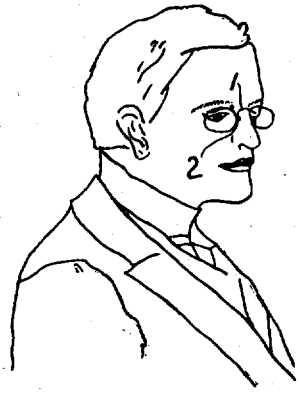
Figure 2:
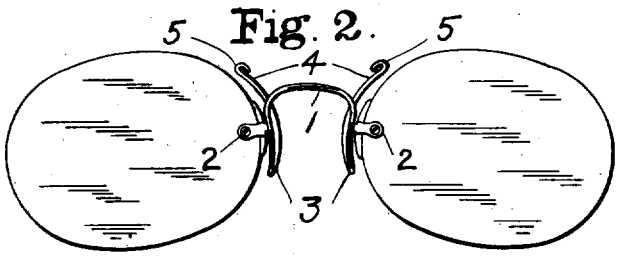
Figure 3:
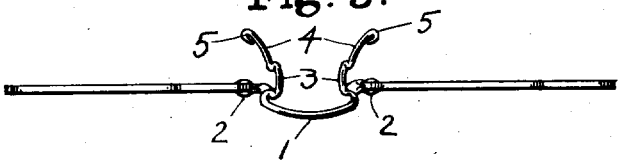
Figure 4:
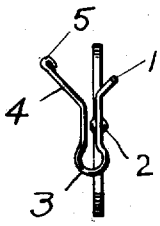

In the accompanying drawings: Figure 1—represents the application of my improved glasses. Fig. 2—is a front elevation thereof. Fig. 3—is a top plan view thereof. Fig. 4—is a transverse vertical, central section therethrough, one of the guards being seen in elevation.

Referring to the drawing by numerals, 1 indicates a nose bridge or bow-spring to which the lens clamps 2 are fixed directly. Below each lens clamp, the spring wire is bent to form a fold or loop 3 which is flat in that the front and rear members of the loop do not cross each other but are side by side so as to rest equally, throughout their length, against the flesh at the side of the nose. Above each loop the wire extends in a curved direction, as at 4, and terminates in an enlargement 5. The two extensions 4—4 reach upwardly, and rearwardly and diverge as shown in Fig. 2, and terminate in enlargements 5. The enlargements 5 are considerably above the bow 1, so that they, as well as the upper portions of the extensions 4, lie, when in place, well up beneath the brow. The loops 3 and the extensions 4 provide for a relatively great range of adjustment, by bending them, without inconvenient positioning of the bow. This arrangement relieves the nose from pinching because the flat loops 3, 3, need only bear on the sides of the nose with sufficient firmness to prevent the glasses from slipping downwardly, the extensions 4 serving to prevent the glasses from being jarred upwardly, or wobbling off. And there is little or no tendency of the lenses to become angularly displaced by vibrations due to movements of the head. The flat loops or folds 3, with their front and rear members bearing continuously and equally on the sides of the nose, present ample resistance to downward slipping of the glasses. And sufficient of the skin or flesh of the nose will protrude between the front and rear members of the loops, without objectional pinching, to prevent outward displacement of the glasses.

The enlargements 5 not only serve to protect the skin of the user from being scratched by wire ends, but they aid in holding the glasses steadily because they present larger areas to bear upwardly against the supra-orbital arches. The enlargements, it will be observed, are so disposed that they will bear flatwise against the inner curves of said arches.

By making the mounting, as described, of a single piece of wire from one end to the other, the device is exceedingly simple and of low cost. So few bends are made in the wire that those bends can be easily made, and can be easily altered to suit individual wearers. Owing to the length of the wire that extends from the bottom of loop 3 to the enlargement 5, there is an extended bearing on the nose so that there is an equal distribution of pressure, and no excess of pressure at any one point on either the nose or arch. This structure of the single curved length of the bottom of the loop 3 to the enlargement 5 also possesses the advantage of enabling the frames to be conveniently and properly shaped to individual wearers, which could not be done with loops or portions of wire crossing each other.

I claim:

1. A mounting for eyeglasses having a nose bridge, flat loops to bear on the sides of the nose, and diverging rearwardly deflected extensions leading from the bottoms of said loop and terminating in a higher plane than the nose bridge.

2. A mounting for eyeglasses comprising a single piece of spring wire having a central portion forming a nose bridge and end portions deflected rearwardly and terminating in a higher plane than the nose bridge, and portions intermediate the nose bridge and end portions presenting loops to bear on the sides of the nose, the front and rear members of said loops being side by side, whereby they will bear uniformly on the nose.

3. A mounting for eyeglasses consisting of a single piece of spring wire, said mounting comprising a bow-spring to rest upon the bridge of the nose and presenting flat loops to bear against opposite sides of the nose and having extensions which diverge upwardly from each other and are formed with enlarged terminals located at points well above the plane of the bow spring.

4. A mounting for eyeglasses comprising a single piece of spring wire having a central portion forming a nose bridge and end portions deflected rearwardly and terminating in a higher plane than the nose bridge, and portions intermediate the nose bridge and end portions presenting flat loops to bear on the sides of the nose, the wire from the bottom of each loop to its free end comprising a single curved length.

5. A mounting for eyeglasses consisting of a single piece of spring-wire, said mounting comprising a bow-spring shaped to rest upon and engage the bridge of the nose, a guard extending beyond the bow-spring at each end thereof, the material of each guard extending downwardly to a point below the horizontal axes of the lenses and forming a fold, and thence upwardly to a point beyond the bow-spring and terminating in an enlargement, said folds each lying in a plane at right angles to the lens whereby to grasp the flesh of the nose of the wearer, and lens engaging clamps fixed to the bow-spring.

In testimony whereof I affix my signature in presence of two witnesses.

JAMES T. LAUGHLIN.

Witnesses:

Wm. B. Davidson,

F. L. Armstrong.

Copies of this patent may be obtained for five cents each, by addressing the "Commissioner of Patents, Washington, D. C."